(12) United States Patent
Kryhlmand et al.

(10) Patent No.: US 7,997,379 B2
(45) Date of Patent: Aug. 16, 2011

(54) HYDRAULIC STEERING

(75) Inventors: Anders Kryhlmand, Sydals (DK); Ove Pedersen, Aabenraa (DK); Niels Bjarne Hansen, Aabenraa (DK); Poul Ennemark, Soenderborg (DK)

(73) Assignee: Sauer-Danfoss Aps, Nordborg (DK)

( * ) Notice: Subject to any disclaimer, the term of this patent is extended or adjusted under 35 U.S.C. 154(b) by 696 days.

(21) Appl. No.: 11/714,510

(22) Filed: Mar. 6, 2007

(65) Prior Publication Data
US 2007/0221437 A1 Sep. 27, 2007

(30) Foreign Application Priority Data
Mar. 8, 2006 (DE) .................. 10 2006 010 695

(51) Int. Cl.
*B62D 5/06* (2006.01)

(52) U.S. Cl. .................. 180/441; 180/403; 180/442

(58) Field of Classification Search .................. 180/441, 180/442, 403, 417
See application file for complete search history.

(56) References Cited

U.S. PATENT DOCUMENTS

| | | | |
|---|---|---|---|
| 3,394,545 A | 7/1968 | Thompson et al. | |
| 4,215,720 A | 8/1980 | Becker | |
| 4,311,006 A | 1/1982 | Becker | |
| 4,345,614 A | 8/1982 | Karlberg et al. | |
| 4,703,819 A | 11/1987 | Hosotani | |
| 4,736,811 A | 4/1988 | Marsden et al. | |
| 5,020,618 A | 6/1991 | Nagao | |
| 5,165,447 A | 11/1992 | Arbjerg et al. | |
| 5,234,070 A | 8/1993 | Noah et al. | |
| 5,263,321 A | 11/1993 | Thomsen et al. | |
| 5,520,262 A | 5/1996 | Marcott | |
| 6,408,977 B1 | 6/2002 | Obertrifter et al. | 180/442 |
| 6,490,861 B2 | 12/2002 | Biggi et al. | |
| 6,804,956 B2 * | 10/2004 | Pedersen et al. | 60/384 |
| 6,863,147 B2 | 3/2005 | Catellani | 180/417 |
| 6,971,472 B2 | 12/2005 | Pedersen et al. | |
| 2004/0182636 A1 | 9/2004 | Pedersen et al. | |
| 2004/0221714 A1* | 11/2004 | Bitter et al. | 91/436 |
| 2006/0156914 A1* | 7/2006 | Dixen et al. | 91/444 |

FOREIGN PATENT DOCUMENTS

| | | |
|---|---|---|
| DE | 102 57 130 A1 | 7/2004 |
| DE | 10 2004 021 531 A1 | 9/2005 |
| DE | 10 2004 021 351 | 11/2005 |
| EP | 0 244 418 B1 | 11/1988 |

(Continued)

OTHER PUBLICATIONS

Article "Reatronic" from website http://ognibene.com/eng/02/xidro_reatronic.htm dated Mar. 13, 2007; 2 pages.
Co-pending U.S. Appl. No. 11/714,364 entitled "Hydraulic Steering" filed Mar. 6, 2007.
Co-pending U.S. Appl. No. 11/714,419 entitled "Hydraulic Steering" filed Mar. 6, 2007.
Co-pending U.S. Appl. No. 11/714,424 entitled "Hydraulic Steering" filed Mar. 6, 2007.

*Primary Examiner* — Joanne Silbermann
*Assistant Examiner* — Tashiana Adams
(74) *Attorney, Agent, or Firm* — McCormick, Paulding & Huber LLP

(57) ABSTRACT

The invention concerns a hydraulic steering (1) with a steering valve (7) located between a supply connection arrangement (P, T) and a steering motor (2). It is endeavored to improve the safety of such a steering. For this purpose, the steering valve (7) has a hydraulic drive (9, 10) with a pilot valve arrangement (11) supplied by a pressure control valve (5), a stop valve (16) being located between the pressure control valve (5) and the pilot valve arrangement (11).

14 Claims, 4 Drawing Sheets

FOREIGN PATENT DOCUMENTS

| | | |
|---|---|---|
| EP | 1 447 307 A2 | 1/2004 |
| GB | 1355955 A | 6/1974 |
| GB | 2 341 159 A | 3/2000 |
| WO | 86/05455 | 9/1986 |

* cited by examiner

HYDRAULIC STEERING

CROSS REFERENCE TO RELATED APPLICATIONS

Applicant hereby claims foreign priority benefits under U.S.C. §119 from German Patent Application No. 10 2006 010 695.4 filed on Mar. 8, 2006, the contents of which are incorporated by reference herein.

FIELD OF THE INVENTION

The invention concerns a hydraulic steering with a steering valve located between a supply connection arrangement and a steering motor.

BACKGROUND OF THE INVENTION

Such a steering is known from, for example, DE 102 57 130 A1. The steering valve has a valve slide with power assisted activation. When displacing the valve slide, a path from the supply connection arrangement to the steering motor is more or less released, so that the steering motor is activated.

A similar embodiment is shown in the later published German patent application 10 2004 021 351.

When the steering valve is hydraulically activated, leakages inside the steering that cannot be avoided cause the risk that the steering valve is activated, even though this is not desired.

SUMMARY OF THE INVENTION

The invention is based on the task of improving the safety of such a steering.

With a hydraulic steering as mentioned in the introduction, this task is solved in that the steering valve has a hydraulic drive with a pilot valve arrangement supplied by a pressure control valve, a stop valve being located between the pressure control valve and the pilot valve arrangement.

With such a solution the safety is improved by two features. Firstly, the steering valve can only be supplied with a certain pressure, which is set and thus limited by the pressure control valve. Accordingly, the risk that leakages occur in connection with too high pressures, which could cause a displacement of the steering valve, is relatively small. Further, the supply of the pilot valve arrangement that is ultimately responsible for the activation of the steering valve can be interrupted by the stop valve. When no hydraulic fluid can reach the pilot valve arrangement, the setting of the pilot valves in the pilot valve arrangement has very little importance. The pilot valves can namely no longer let hydraulic pressure reach the control inlets of the steering valve. Accordingly, the risk that the steering valve will be involuntarily displaced is very small. The safety is considerably improved.

Preferably, a steering unit with feedback behaviour is located in parallel to the steering valve, a feedback suppression device being located in a path between the steering unit and the steering motor, said feedback suppression device preventing a feedback of pressures at the steering motor on the steering unit when the steering valve is activated. The steering unit is activated by a steering member, for example a traditional steering handwheel. When a steering unit and a steering valve are used in parallel, steering with either the steering valve or the steering handwheel is optional. In many cases, feedback behaviour of the steering unit is desired to give the driver a feeling of his vehicle. Further, the feedback behaviour has the advantage that the vehicle returns to straight forward, that is, the wheels or other steered members return to the straight forward position after passing a curve, when the driver lets go of the steering handwheel. When, however, the steering motor is activated by the steering valve, this feedback behaviour can cause that the steering handwheel (or another steering member) moves in an undesired manner. This could be irritating for the operator or even cause damage, when the operator gets in touch with the turning steering handwheel. Accordingly, the feedback suppression device has been provided, which changes the feedback behaviour between the steering motor and the steering unit. As soon as the feedback suppression device is active, a pressure change at the connections of the steering motor will no longer cause a corresponding reaction of the steering unit and thus the steering member will no longer be moved. When the feedback suppression device is automatically activated on activation of the steering valve, no additional measures by the operator are required.

It is preferred that the feedback suppression device has an activation inlet, which is connected to an outlet of the stop valve. Then the stop valve assumes two tasks at the same time. It ensures the supply of hydraulic fluid to the pilot valve arrangement, when the steering valve must be hydraulically activated. In this case, the stop valve is opened. When it is opened, the pressure ruling at its outlet can at the same time be used to activate the feedback suppression device. When, however, the stop valve is closed, because the steering valve is not hydraulically activated, the feedback suppression device is automatically deactivated, so that the steering motor can again act back upon the steering unit.

Preferably, the pilot valve arrangement has solenoid valves, and a control device is provided, with which the solenoid valves and the stop valve can be deenergized. In a similar manner the control device can of course supply the solenoid valves with the corresponding electrical signals for activation of the steering valve, and at the same time open the stop valve by means of a corresponding electrical signal, to ensure the supply of hydraulic fluid to the pilot valve arrangement. As both the pilot valve arrangement and the stop valve can be electrically activated, the switching technical design can be kept relatively small.

Preferably, in a first switching position the stop valve creates a connections between the pressure control valve and the pilot valve arrangement, and in a second switching position a connection between the pilot valve arrangement and a low-pressure connection. The connection to the low-pressure connection, for example a tank connection, has the advantage that the pilot valve arrangement and also the feedback suppression device are actually pressure relieved, so that stored, pressurised hydraulic fluid will not cause a risk that the steering valve is displaced. As soon as the stop valve has assumed its "safety position", the feedback suppression device is relieved and can then return to its position, in which a feedback is permitted.

Preferably, the feedback suppression device acts upon both working pipes between the steering unit and the steering motor. Thus, the steering behaviour and the feedback behaviour become "symmetrical", as the lengths of the hydraulic pipes, which could change their volume when acted upon by pressure, correspond to each other, when the feedback suppression device acts upon both working pipes.

Preferably, the feedback suppression device has a valve arrangement, which can be hydraulically activated. The valve arrangement, which is a substantial part of the feedback suppression device, is thus purely hydraulically activated. An additional electrical system is thus not required to change the feedback behaviour of the steering unit. Hydraulic fluid under the required pressure is available in a hydraulic steering anyway, so that relatively few additional measures will be sufficient to activate or deactivate the feedback suppression device. When the feedback suppression device is deactivated, the driver will feel reactions at the steering member, which originate from a pressure change at the connections of the steering motor. When the feedback suppression device is activated, the driver will not feel the effects of such pressures.

Preferably, the valve arrangement has a biasing device, which prestresses the valve arrangement in a feedback position. When the feedback suppression device is not activated by a hydraulic pressure, it goes in a defined manner to a state, in which a feedback from the steering motor or from pressures ruling here, respectively, on the steering unit is possible.

Preferably, the valve arrangement has at least one valve, which can be opened by a pressure at the steering unit. This has the advantage that, in a manner of speaking, the pressure of the steering valve can be overridden by the steering unit. When the steering valve is activated, the feedback suppression device is active, that is, it usually blocks the path between the steering motor and the steering unit. However, this blocking can be overcome again, when the steering unit is activated. The steering unit then, for example, generates a pressure that opens the valves of the valve arrangement in such a manner that a passage of hydraulic fluid from the steering unit to the steering motor and back is possible. This is an additional safety measure.

In a first embodiment this can, for example, be realised in that a two-way valve is arranged between the two working pipes, whose outlet is connected to an opening inlet of the valve. The two-way valve then passes on the higher of the two pressures in the working pipes to the opening inlet of the valve or the valves, so that the valves open and create a connection between the steering unit and the steering motor.

In an alternative embodiment it may be ensured that the steering unit has a pressure signal outlet that is connected to the opening inlet of the valve. An "S-pressure" or an "S-signal" can be obtained from such a pressure signal outlet. This S-signal, which could also be called "EL-signal", is made so that in the neutral position of the steering unit and in a small band around the neutral position it is relieved to the tank or another area with low pressure. During steering to the left or to the right the S-signal always receives the pressure ruling at the outlet side of the set of teeth of the steering unit, that is, practically the pressure ruling in the "left" or "right" working pipe. Thus, a hard point in the steering is avoided, as no hydraulic fluid is consumed, but all the intended hydraulic fluid is led to the steering motor. Further, there is a clearly defined "non-feedback state", as in the neutral position of the steering unit the S-signal is effectively set at the tank pressure. Further, the concept offers an advantage in emergency steering situations, where the pressure built up on one of the two working pipes gives a further safety for the forced opening of the valves. This signal is normally used for turning on electrical motors in connection with a fork lift truck. In the known case the hydraulic signal of the steering unit is converted by a pressure transmitter to an electrical signal that can turn on an electrical motor, which again drives a hydraulic pump, so that a hydraulic steering can be used.

In a third embodiment it may be ensured that the steering unit has a load-sensing connection that is connected to the opening inlet of the valve. As soon as the steering unit is activated, the pressure at the load-sensing connection increases, so that also this pressure can be used to open the valve or the valves against the pressure at the outlet of the stop valve.

Preferably, a shock valve arrangement is located between the feedback suppression device and the steering motor. When large external forces occur, which act upon the steering motor, it is the task of the shock valve arrangement on the one side to permit a replenishment of hydraulic fluid to avoid cavitations, and on the other side to avoid a too high pressure to prevent damages to the steering motor or the connected pipes. The shock valve arrangement could, for example, comprise two non-return valves opening in the direction of the working pipes and being connected to a low-pressure connection, and two relief valves which are connected to the working connections and the low pressure connection. When the shock valve arrangement is located so that the feedback suppression device does not influence the path between the steering motor and the shock valve arrangement, the shock valve arrangement is practically always operable, independently whether or not feedback suppression has occurred.

BRIEF DESCRIPTION OF THE DRAWINGS

In the following the invention is described on the basis of preferred embodiments in connection with the drawings, showing.

DETAILED DESCRIPTION OF THE INVENTION

Figure 1:
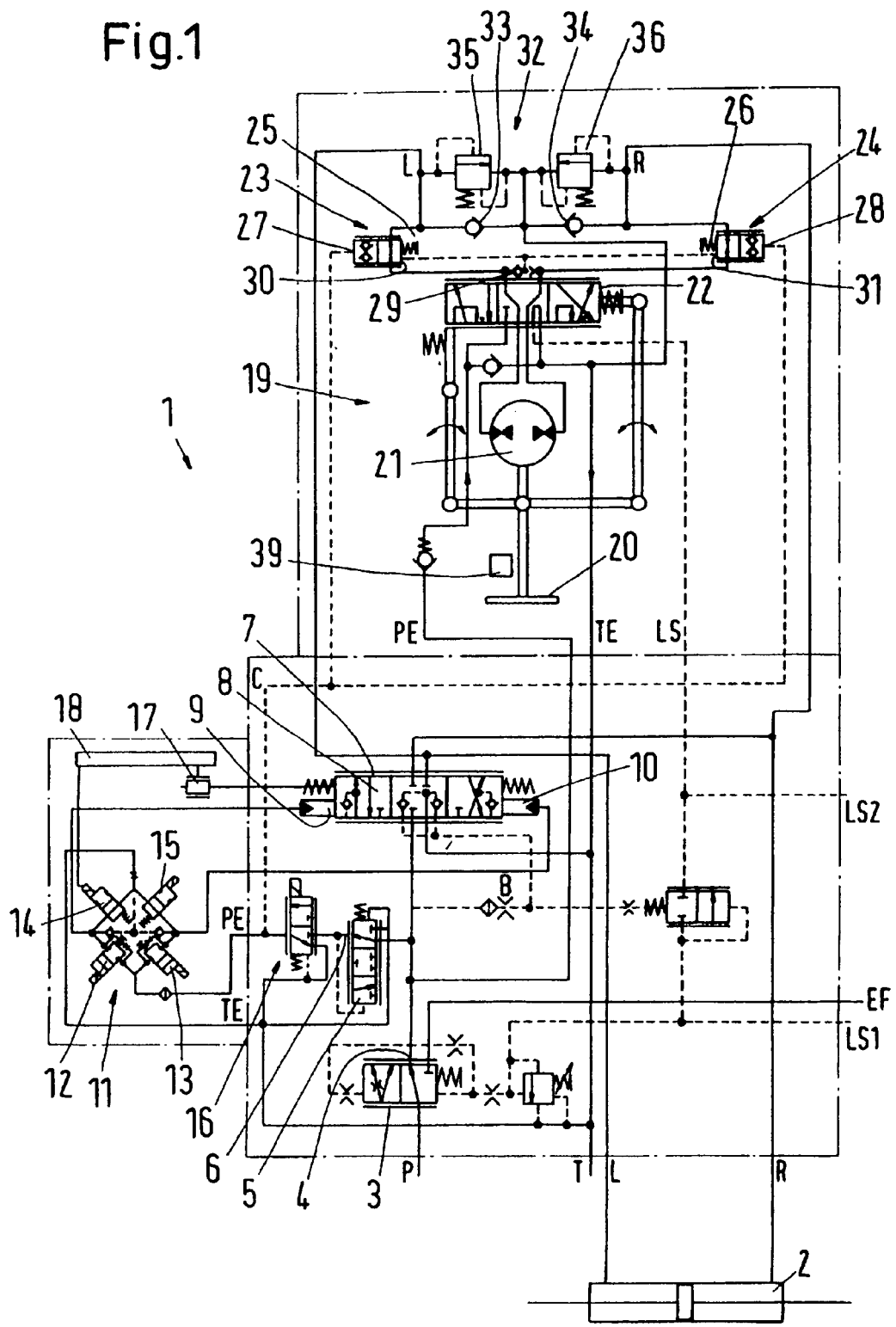
FIG. 1 is a schematic view of a hydraulic steering.

FIG. 1 shows a hydraulic steering 1 with a steering motor 2 that can be supplied with hydraulic fluid via two working pipes L, R. The hydraulic fluid is supplied via a high-pressure connection P and discharged via a low-pressure connection T. The high pressure connection P is, for example, connected to a pump that is driven by the drive motor of a vehicle, which is equipped with the steering 1. The low pressure connection T is, for example, connected to a tank (not shown in detail).

First the high-pressure connection P is connected to a priority valve 3 known per se, whose priority outlet 4 is connected to a pressure control valve 5. The outlet 6 of the pressure control valve 5 supplies a pressure of, for example, 12 bar. The priority outlet 4 of the priority valve 3 is further connected to an inlet of a proportionality valve 7 that has a slide 8, which can be displaced by pressures at control connection 9, 10.

The control connections 9, 10 are connected to a pilot valve arrangement 11, in which four pilot valves 12 to 15 in the form of solenoid valves are arranged in the shape of a bridge. A diagonal starting between the two pilot valves 12, 13 and ending between the pilot valves 14, 15 serves the supply. The other diagonal bearing on the one side between the pilot valves 12, 14 and on the other side between the pilot valves 13, 15 is connected to the control connections 9, 10. By controlling the pilot valves 12 to 15 the pressure between the control connections can be changed and displace a slide of the proportional valve 7.

A connection between the pilot valves 12, 13 is connected to the outlet 6 of the pressure control valve 5 via a stop valve 16, which either connects the pressure control valve 5 to the pilot valve arrangement 11 or, in the position shown, connects the pilot valve arrangement 11 to the low-pressure connection T.

The proportional valve 7 is connected to a position sensor 17, which again is connected to a control device 18 that controls the pilot valve arrangement 11. In a manner not shown in detail the control device 18 is further supplied with a steering signal containing information about the activation of the steering motor 2.

Depending on the position of the slide 8 of the proportional valve 7 one of the working pipes L, R is connected to the high-pressure connection P, or rather, the priority outlet 4 of the priority valve 3, while the other working pipe R, L is connected to the low-pressure connection T.

A steering unit 19 is connected to the steering motor 2 in parallel with the proportional valve 7, which can also be called "steering valve". The priority outlet 4 of the priority valve 3 is connected to an inlet PE of the steering unit. The low-pressure connection T is connected to a connection TE of the steering unit 19.

The steering unit 19 can be activated by a steering handwheel 20 or another activation member. In a manner known per se it has a measuring motor 21 and a direction section 22. When the steering handwheel 20 is turned, an inner slide is, for example, turned in relation to an outer slide, thus releasing a flow path for hydraulic fluid to the measuring motor 21. This will drive the measuring motor 21, which returns the two slides to their original relative positions, so that an exactly measured amount of hydraulic fluid can flow from the high-pressure connection P to the steering motor 2 and from there back to the low-pressure connection T.

The steering unit 19 has feedback behaviour, that is, when pressure changes occur in the working pipes L, R, the steering handwheel 20 is turned, when no further measures have been taken.

These pressure changes can have several reasons. Firstly, external forces can act upon the steering motor 2 so that pressure changes occur at the working pipes L, R. Secondly, pressure changes also occur, when the steering motor 2 is supplied by the proportional valve 7.

In order to change the feedback behaviour, that is, to stop the feedback of the steering motor 2 on the steering unit 19, each working pipe L, R is provided with a valve 23, 24, of which only the slides are shown. In the shown switching position of the valves 23, 24 a connection exists between the steering unit 19 and the steering motor 2, that is, the two valves 23, 24 are open. In this switching position a feedback of pressures at the steering motor 2 to the steering unit 19 is possible. In another switching position (not shown), however, the working pipes L, R between the steering motor and the steering unit 19 are interrupted. A feedback is then no longer possible. Both valves 23, 24 have springs 25, 26, which bias the valves 23, 24 into the shown opening position.

The outlet of the stop valve 16 is connected to a control connection C. The control connection C again is connected to closing inlets 27, 28 of the valves 23, 24. A pressure ruling at the control connection C that exceeds the force of the spring 25, 26 then causes the valves 23, 24, which form a feedback suppression device, to close, so that a pressure change in the working pipes L, R no longer causes a turning of the steering handwheel 20 or another feedback in the steering unit 19.

The force of the springs 25, 26, for example, corresponds to a pressure of 7 bar. As the pressure from the pressure control valve 5 is 12 bar, the valves 23, 24 are closed as soon as the stop valve 16 opens. The stop valve 16 is opened by the control device 18, as soon as the pilot valve arrangement 11 is activated. When, however, the proportional valve 7 shall not be activated, the pilot valves 12 to 15 of the pilot valve arrangement 11 are de-energized. De-energizing the pilot valves 12 to 15 will also de-energize the stop valve 16, which relieves the control inlet C and thus also the closing connection 27, 28 to the low-pressure connection T.

However, it is also possible that the stop valve 16 is turned on or off at another time as the pilot valve arrangement 11. It is also possible that the signal for opening the stop valve 16 comes from a different signal source than the control device 18, for example, to increase the safety.

In order to enable an override with the steering unit 19 also when steering with the proportional valve 7, a two-way valve 29 is located at the outlet of the steering unit 19, the outlet of the two-way valve being connected with opening inlets 30, 31 of the valves 23, 24. As soon as the steering unit 19 generates a pressure in one of the two working pipes L, 5, which, together with the force of the springs 25, 26, exceeds the pressure at the control inlet C (for example 12 bar), the two valves 23, 24 are switched to the shown passage position.

Between the feedback suppression device formed by the valves 23, 24 and the steering motor 2 is located a shock valve arrangement 32. The shock valve arrangement 32 shall prevent cavitation in the steering motor 2 caused by external forces acting upon the steering motor 2. For this purpose, the two working pipes L, R are connected to the low-pressure connection T via non-return valves 33, 34, the non-return valves 33, 34 opening from the low-pressure connection T to the working pipes L, R. Further, the shock valve arrangement 32 has two relief valves 35, 36, which relieve a too high pressure from the two working pipes L, R to the low-pressure connection T. As the shock valve arrangement 32 is immediately connected to the steering motor 2, its function is not influenced by the feedback suppression device with the valves 23, 24.

Figure 2:
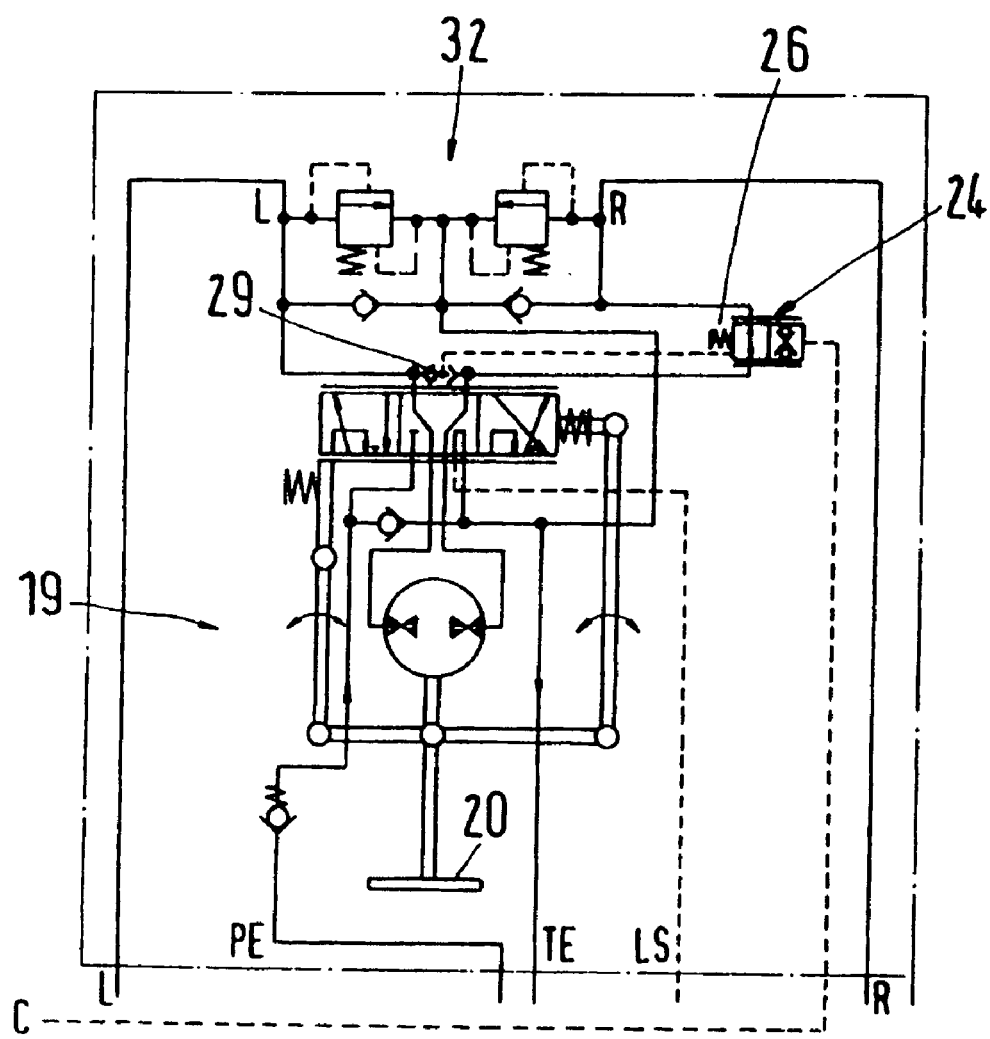
FIG. 2 is a modified embodiment of a steering unit.

FIG. 2 shows a section of a modified embodiment of the steering 1 according to FIG. 1. As only an area in the upper half of FIG. 1, that is, above the control connection C, has changed (in relation to the view in FIG. 1), only this area is shown in FIG. 2. The area in FIG. 1 below the control connection C is unchanged. Same elements have the same reference numbers as in FIG. 1.

In the embodiment according to FIG. 2 a change in relation to FIG. 1 is that only one valve 24 is located in a working pipe R, the valve 24 being opened by the spring 26 and a pressure from the outlet of the two-way valve 29 and closed by the pressure at the control inlet C. In many cases it is sufficient only to interrupt one working pipe R to prevent feedback from the steering motor 2 on the steering unit 19.

Figure 3:
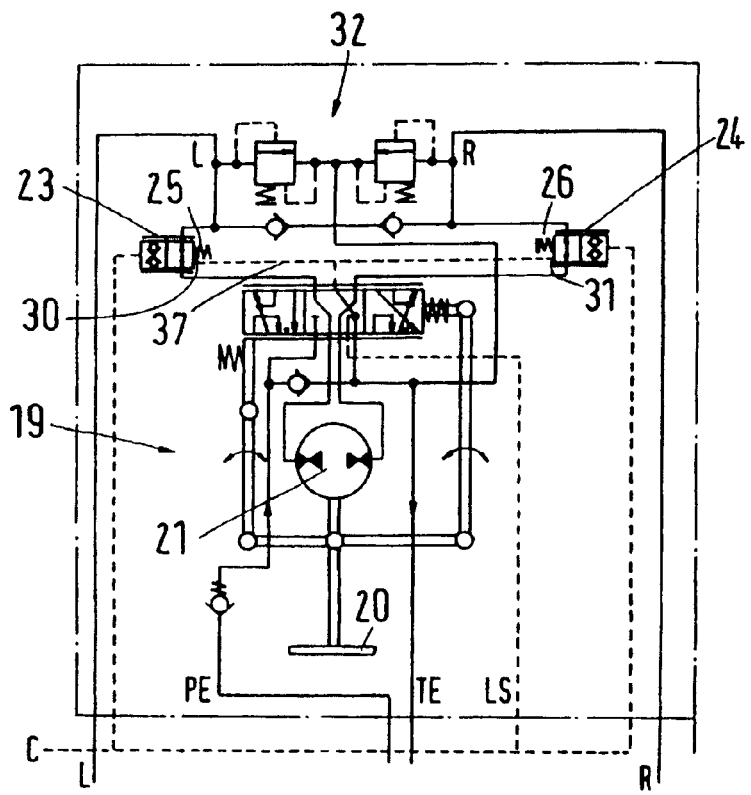
FIG. 3 is a third embodiment of a steering unit.

FIG. 3 shows a third embodiment, in which again a valve 23, 24 is located in each working pipe L, R. The two valves 23, 24 are also closed by the pressure at the control inlet C, which is controlled by the stop valve 16, to prevent a feedback from the steering motor 2 on the steering unit 19.

For the opening, the steering unit 19 is provided with a pressure signal outlet 37. A so-called S-pressure or S-signal is available at the pressure signal outlet 37. In the neutral position of the steering unit 19 the S-signal has a value, which corresponds relatively accurately to the pressure at the low-pressure connection T or a low-pressure connection TE of the steering unit 19. As soon as the steering unit 19 is activated, for example by turning the steering handwheel 20, the S-signal gets the pressure value at the outlet of the measuring motor 21, that is, basically the pressure value ruling in the pressurised or deflected working pipe L, R. The S-signal has the advantage that the hydraulic fluid required to open the valves 23, 24 is no longer taken from the amount of hydraulic fluid used for the activation of the steering motor.

Also with this embodiment of the feedback suppression device with the valves 23, 24, an overriding of the steering behaviour caused by the proportional valve 7 by the steering handwheel 20 is possible.

Figure 4:
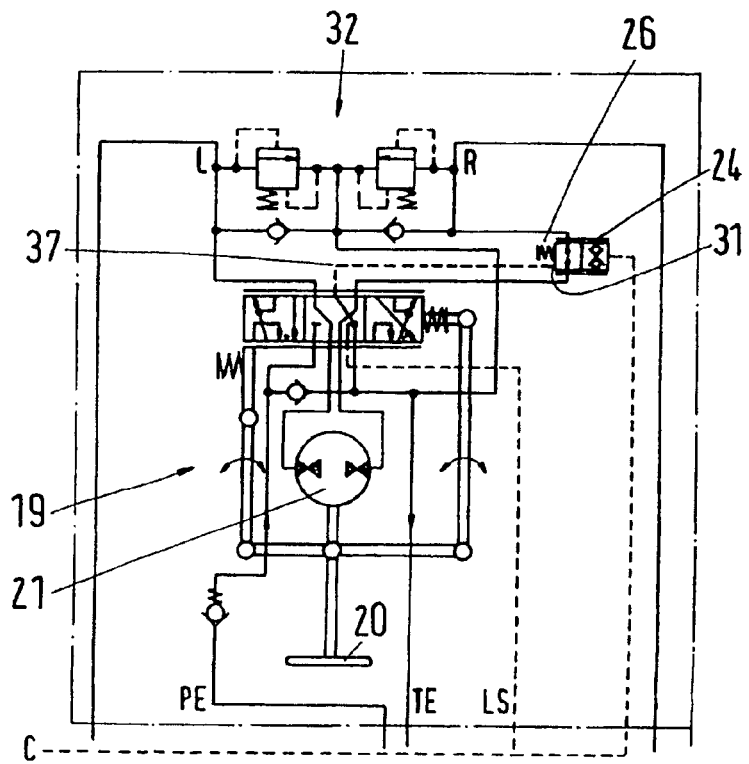
FIG. 4 is a fourth embodiment of a steering unit.

FIG. 4 shows a modified embodiment of the steering according to FIG. 3, in which only one valve 24 is located in one working pipe R, which can be closed by the pressure at the control inlet C and opened by the pressure at the pressure signal outlet 37 and the force of the spring 26.

Figure 5:
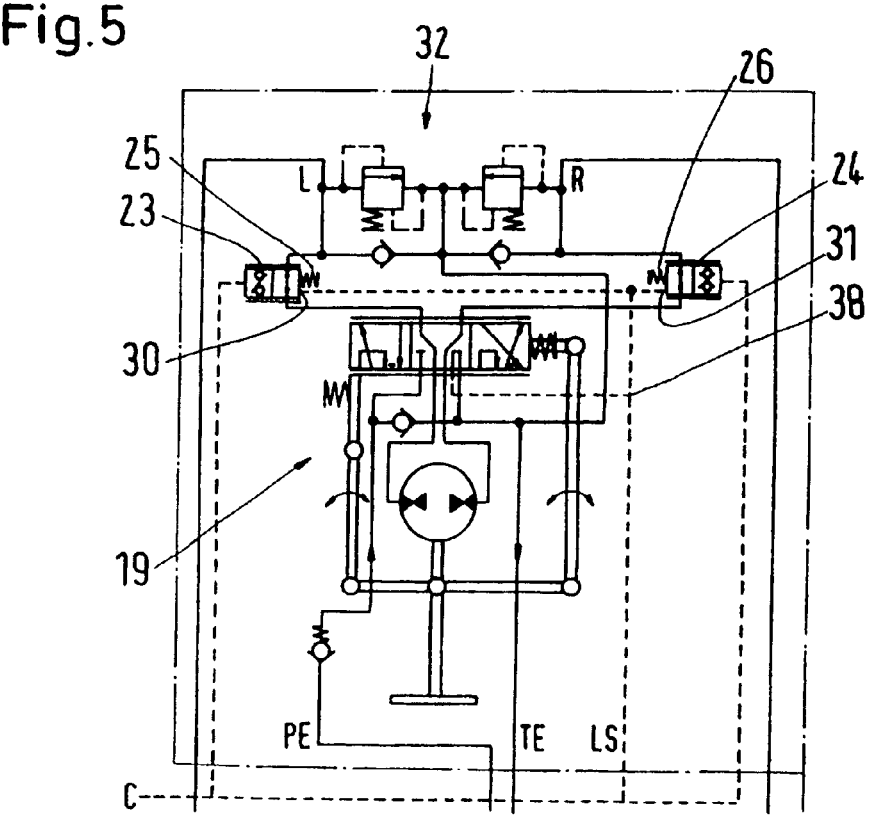
FIG. 5 is a fifth embodiment of a steering unit.

FIG. 5 shows a further modified embodiment according to the view in FIG. 3. Here each working pipe L, R is provided with a valve 23, 24, which are closed by the pressure at the control outlet C and opened by the force of the springs 25, 26.

The steering unit 19 has a load-sensing connection 38, from which a load-sensing signal LS can be achieved. The load-sensing signal LS corresponds to the pressure in the working pipe, which has been pressurised for the steering.

The load-sensing connection 38 is connected to the opening inlets 30, 31 of the valves 23, 24.

As soon as the steering unit 19 is activated, the load-sensing pressure LS at the load-sensing connection 38 increases and the valves 23, 24 are opened, independently of whether or not the vehicle is otherwise steered by the proportional valve 7.

Figure 6:
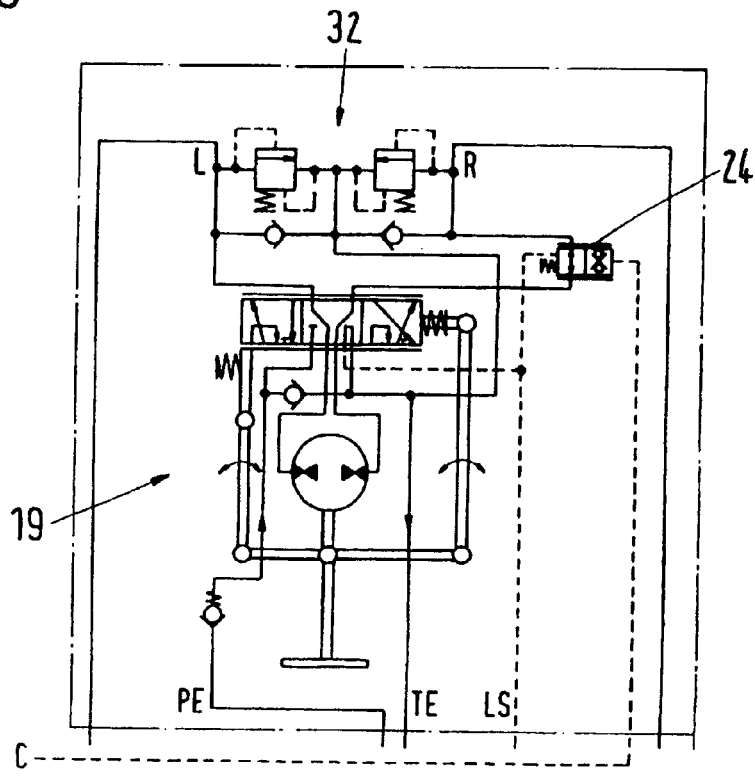
FIG. 6 is a sixth embodiment of a steering unit.

FIG. 6 shows an embodiment of the steering according to FIG. 5, in which only one valve 24 is located in one working pipe R.

With all embodiments of the steering 1 the following behaviour can be achieved:

On the one side, the vehicle can be steered by the steering unit 19, that is, in the classical manner, in that an operator turns the steering handwheel 20. In this case the proportional valve 7 is not active and the pilot valves 12 to 15 of the pilot valve arrangement 11 are deenergized. Deenergizing the pilot valve arrangement 11 will also deenergize the stop valve 16, so that the pilot valve arrangement 11 and the opening inlets 27, 28 of the valves 23, 24 are connected to the low-pressure connection T. The same applies in a corresponding manner for a valve 24, when only one valve is used.

When the steering of the vehicle shall take place via the proportional valve 7, the pilot valve arrangement 11 is energized and at the same time or almost at the same time also the stop valve 16, so that the pilot valve arrangement 11 is supplied with hydraulic fluid under a pressure controlled by the pressure control valve 5. This pressure also reaches the pressure inlet C and thus also the opening inlets 27, 28 of the valves 23, 24 (or only the valve 24, respectively), so that the valves 23, 24 close and a feedback from the steering motor 2 on the steering unit 19 is no longer possible.

As soon as the steering unit 19 is activated, the pressure at the opening inlets 30, 31, at least together with the force of the springs 25, 26, exceeds the pressure at the control inlet C and the valves 23, 24 are opened, so that in a manner of speaking the steering unit 19 can override the effect of the proportional valve 7.

FIG. 1 additionally shows a steering handwheel sensor 39, which can be connected to the control arrangement 18. By means of the steering handwheel sensor 39 it can be achieved that, when activating the steering handwheel 20, the proportional valve 7 is deactivated and the pilot valve arrangement 11 and the stop valve 16 are deenergized. In many cases it is also sufficient only to deenergize and thus block the stop valve 16 and to deenergize the pilot valve arrangement 11 or even only to deenergize the stop valve 16. A corresponding steering handwheel sensor 39 can of course also be provided in the embodiments according to FIGS. 2 to 6.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering with a steering valve located between a supply connection arrangement and a steering motor, wherein the steering valve has a hydraulic drive with a pilot valve arrangement supplied by a pressure control valve, a stop valve being located between the pressure control valve and the pilot valve arrangement.

2. The steering according to claim 1, wherein a steering unit with feedback behaviour is located in parallel to the steering valve, a feedback suppression device being located in a path between the steering unit and the steering motor, said feedback suppression device preventing a feedback of pressures at the steering motor on the steering unit when the steering valve is activated.

3. The steering according to claim 2, wherein the feedback suppression device has an activation inlet, which is connected to an outlet of the stop valve.

4. The steering according to claim 2, wherein the pilot valve arrangement has solenoid valves, and a control device is provided, with which the solenoid valves and the stop valve can be deenergized.

5. The steering according to claim 4, wherein in a first switching position the stop valve creates a connection between the pressure control valve and the pilot valve arrangement, and in a second switching position a connection between the pilot valve arrangement and a low-pressure connection.

6. The steering according to claim 2, wherein the feedback suppression device acts upon on both working pipes between the steering unit and the steering motor.

7. The steering according to claim 2, wherein the feedback suppression device has a valve arrangement, which can be hydraulically activated.

8. The steering according to claim 7, wherein the valve arrangement has a biassing device, which prestresses the valve arrangement in a feedback position.

9. The steering according to claim 7, wherein the valve arrangement has at least one valve, which can be opened by a pressure at the steering unit.

10. The steering according to claim 9, wherein a two-way valve is arranged between the two working pipes, whose outlet is connected to an opening inlet of the valve.

11. The steering according to claim 9, wherein the steering unit has a pressure signal outlet that is connected to the opening inlet of the valve.

12. The steering according to claim 9, wherein the steering unit has a load-sensing connection that is connected to the opening inlet of the valve.

13. The steering according to claim 2, wherein a shock valve arrangement is located between the feedback suppression device and the steering motor.

14. A hydraulic steering with a steering valve located between a supply connection arrangement and a steering motor, the steering valve having a hydraulic drive with a pilot valve arranged in parallel with the steering valve,
 wherein the pilot valve arrangement is supplied by a pressure control valve,
 wherein the pilot valve arrangement is connected to a high-pressure connection of the supply connection arrangement via the pressure control valve, and
 wherein a stop valve is located between the pressure control valve and the pilot valve arrangement.

* * * * *